United States Patent
Choi et al.

(10) Patent No.: US 11,745,854 B2
(45) Date of Patent: Sep. 5, 2023

(54) FOLDING PROPELLER FOR AIR MOBILITY

(71) Applicants: Hyundai Motor Company, Seoul (KR); Kia Corporation, Seoul (KR)

(72) Inventors: Jae Young Choi, Seongnam-Si (KR); Sang Hyun Jung, Hwaseong-Si (KR); Chung Sik Yim, Anyang-Si (KR); Kyu Hoon Cho, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 113 days.

(21) Appl. No.: 17/411,981

(22) Filed: Aug. 25, 2021

(65) Prior Publication Data

US 2022/0194554 A1 Jun. 23, 2022

(30) Foreign Application Priority Data

Dec. 21, 2020 (KR) .................. 10-2020-0179657

(51) Int. Cl.
*B64C 11/28* (2006.01)
*F01D 7/00* (2006.01)

(52) U.S. Cl.
CPC ................ *B64C 11/28* (2013.01); *F01D 7/00* (2013.01); *F05D 2220/90* (2013.01)

(58) Field of Classification Search
CPC ....... B64C 11/28; B64C 27/50; B64C 27/022; B64C 11/04; F01D 7/00
See application file for complete search history.

(56) References Cited

U.S. PATENT DOCUMENTS

| | | | | |
|---|---|---|---|---|
| 3,528,630 | A * | 9/1970 | Ferris ...................... | B64C 27/50 244/12.3 |
| 3,592,412 | A * | 7/1971 | Glatfelter ............ | B64C 29/0033 416/142 |
| 5,868,351 | A * | 2/1999 | Stamps .................... | B64C 27/50 244/6 |
| 8,376,264 | B1 * | 2/2013 | Hong .................... | B64C 27/605 244/17.23 |
| 2010/0072325 | A1 * | 3/2010 | Sambell .................. | B64C 11/28 244/7 A |
| 2016/0083087 | A1 * | 3/2016 | Schank .................... | B64C 27/30 416/134 A |
| 2017/0144746 | A1 * | 5/2017 | Schank ................. | B64D 27/20 |
| 2018/0079502 | A1 * | 3/2018 | Foskey ..................... | B64C 5/10 |
| 2019/0055003 | A1 | 2/2019 | Luo et al. | |
| 2019/0210718 | A1 | 7/2019 | Wang | |
| 2019/0382106 | A1 | 12/2019 | Prager | |
| 2019/0389569 | A1 | 12/2019 | Paulson | |

* cited by examiner

*Primary Examiner* — Joshua J Michener
*Assistant Examiner* — Cindi M Curry
(74) *Attorney, Agent, or Firm* — MORGAN, LEWIS & BOCKIUS LLP

(57) ABSTRACT

A foldable propeller for air mobility includes a link assembly including a plurality of links facilitating blades to be rotated around a hub as a moving portion vertically slides such that the blades are folded to each other or unfolded from each other.

14 Claims, 2 Drawing Sheets

FOLDING PROPELLER FOR AIR MOBILITY

CROSS REFERENCE TO RELATED APPLICATION

The present application claims priority to Korean Patent Application No. 10-2020-0179657, filed Dec. 21, 2020, the entire contents of which is incorporated herein for all purposes by this reference.

BACKGROUND OF THE INVENTION

Field of the Invention

The present invention relates to a foldable propeller for air mobility which may be folded, so that the propeller used for lifting purposes may be loaded in a folded state on a fuselage during flight for the air mobility, effectively reducing drag during cruising when the propeller is loaded in the folded state on the fuselage, which makes it possible to improve energy efficiency and increase a flight distance accordingly.

Description of Related Art

As compared with conventional aircraft, the biggest feature of urban air mobility (UAM) is vertical take-off and landing (VTOL). At the time of vertical take-off and landing, more propellers for much greater propulsion are required as compared with what are required in a flight state.

On the other hand, in the flight state (during cruising), the flight may continue by lift caused by wings, and thus, some (lift propellers) of the propeller used at the VTOL time are not used. The propellers that are not used during the high-speed flight generates drag (air resistance), causing energy loss.

To reduce drag and increase energy efficiency, it is necessary to load the propellers in a folded state on a fuselage. To load the lift propellers, each including three or more blades having a radius of 1 m or more, on the fuselage, a folding technique is necessarily required. Furthermore, the propellers are required to be folded and deployed during flight, and thus, the folding technique needs to be highly reliable, safe, and stable.

However, there has been no structure so far in which the propellers may be folded during flight, or the folding and blade pitch controlling may be performed simultaneously in an independent manner.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable propeller for air mobility which may be folded, so that the propeller used for lifting purposes may be loaded in a folded state on a fuselage during flight for the air mobility, effectively reducing drag during cruising when the propeller is loaded in the folded state on the fuselage, which makes it possible to improve energy efficiency and increase a flight distance accordingly.

According to various exemplary embodiments of the present invention, a foldable propeller for air mobility includes: a shaft provided with a hub at an upper end portion of the shaft; blades each mounted to the hub through a rotation shaft to be rotated with the hub or to be rotated relative to the hub; a moving portion slidably mounted on the shaft; and a link assembly including a plurality of links connecting the moving portion and the blades and facilitating the blades to be rotated around the hub as the moving portion vertically slides such that the blades are folded to each other or unfolded from each other.

The hub and the blades may be rotated together when the shaft rotates, and the blades may be folded or unfolded with respect to the hub in a state where the hub is stationary when the moving portion slides along the shaft in a state where the shaft is stationary.

The blades may be connected to the hub at respective points of the hub spaced from each other, and each of the blades may be connected to the moving portion through the link assembly.

One of the plurality of blades may be fixed to the hub, and each of the other blades may be pivotally connected to the moving portion through the link assembly so that when the moving portion slides along the shaft, the other blades are folded toward the fixed blade or unfolded in a direction to be far away from the fixed blade.

A first link may be connected to the moving portion, a second link may be connected to a point of the shaft between the moving portion and the hub, and the first link and the second link may be connected to intersect with each other so that when the moving portion slides along the shaft, the first link and the second link perform a scissoring movement therebetween.

The first link and the second link may move in a direction to spread out when the moving portion moves up, and the first link and the second link may move in a direction to gather together when the moving portion moves downwards.

A third link may be connected to an end portion of the first link, the third link may be bent in a horizontal direction thereof, a fourth link may be connected to the bent end portion of the third link, and each of the blades may be connected to the fourth link.

The fourth link may be guided by the third link to perform a rotational movement, and the blade is folded or unfolded while being rotated according to the rotation of the fourth link.

When the first link is moved in a direction to become close to the shaft as the moving portion slides along the shaft, the third link may be brought close to the shaft, the fourth link may be rotated according to the movement of the third link, and the blade may be folded while being rotated according to the rotation of the fourth link.

When the first link is moved in a direction to become far away from the shaft as the moving portion slides along the shaft, the third link may be brought far away from the shaft, the fourth link may be rotated according to the movement of the third link, and the blade may be unfolded while being rotated according to the rotation of the fourth link.

The first link and the second link may be links existing on a plane in a direction perpendicular to the ground, the fourth link may be a link existing on a plane in a direction horizontal to the ground, and the third link may be a link having both end portions connected to the first link and the fourth link, respectively, and having a bent center portion.

The blade may be folded or unfolded on a plane in a direction horizontal to the ground.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
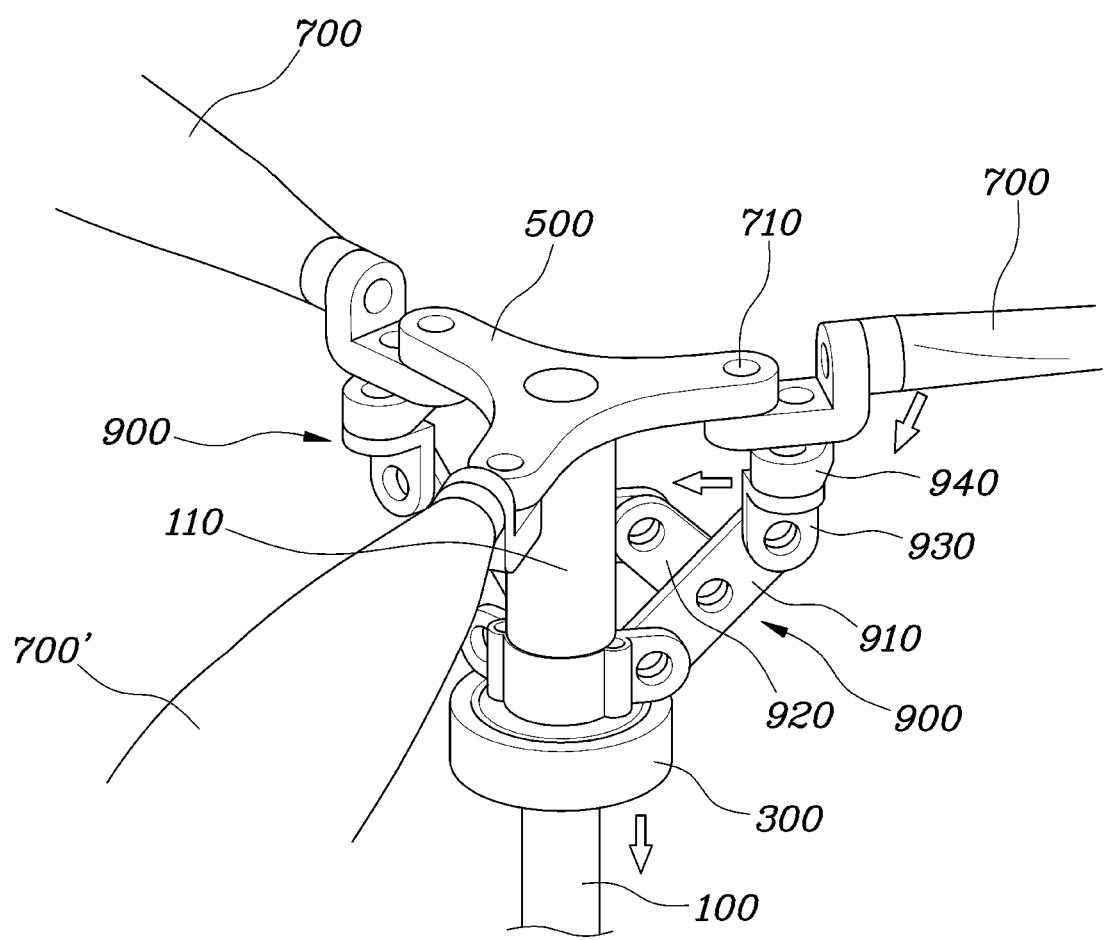
FIG. 1 is a view exemplarily illustrating an unfolded state of a foldable propeller for air mobility according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
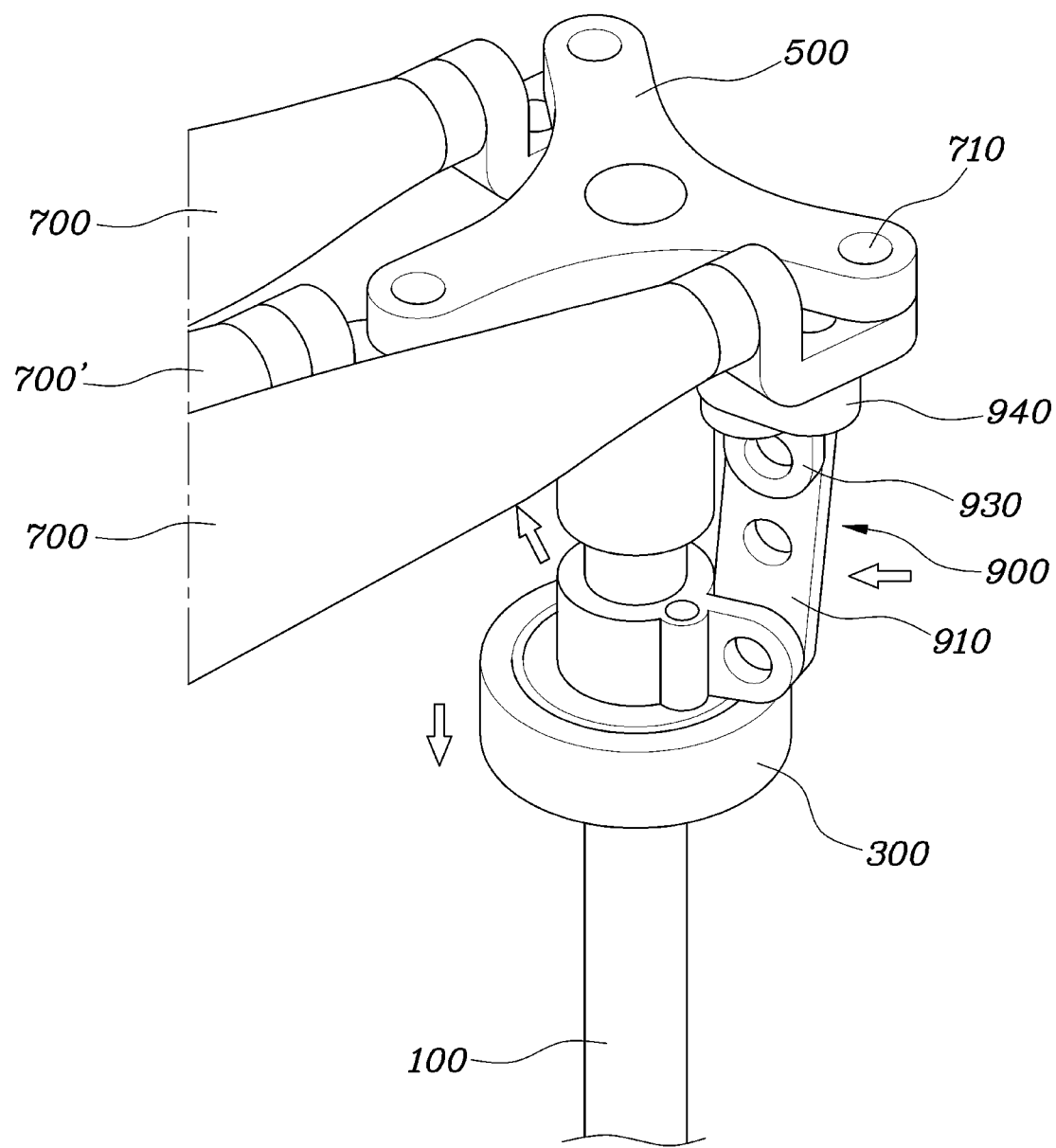
FIG. 2 is a view exemplarily illustrating a folded state of the foldable propeller for air mobility according to various exemplary embodiments of the present invention.

FIG. 1 is a view exemplarily illustrating an unfolded state of a foldable propeller for air mobility according to various exemplary embodiments of the present invention, and FIG. 2 is a view exemplarily illustrating a folded state of the foldable propeller for air mobility according to various exemplary embodiments of the present invention.

The foldable propeller for air mobility according to various exemplary embodiments of the present invention includes: a shaft 100 provided with a hub 500 at an upper end portion thereof; blades 700 each provided at the hub 500 through a rotation shaft 710 to be rotated with the hub 500 or to be rotated relative to the hub 500; a moving portion 300 provided to be vertically slidable on the shaft 100; and a link assembly 900 including a plurality of links connecting the moving portion 300 and the blades 700 to each other and facilitating the blades 700 to be rotated around the hub 500 as the moving portion 300 vertically slides such that the blades 700 are folded or unfolded.

The propeller according to various exemplary embodiments of the present invention is not only basically configured for generating propulsion by rotating but also has a structure for folding or unfolding the blades. When the propeller according to various exemplary embodiments of the present invention is applied as a propeller for lifting purposes, the propeller generates propulsion by rotating during a lifting operation, and is folded during cruising or flying after the lifting operation to reduce air resistance, serving to increase energy efficiency and reduce noise.

The shaft 100 is provided for the basic rotating function of the propeller. The shaft 100 is connected to a driving unit to receive a rotational force for rotation, and the propeller generates propulsion while being rotated according to the rotation of the shaft 100.

The hub 500 is provided at the upper end portion of the shaft 100. Furthermore, a plurality of blades 700 are connected to the hub 500, and the propulsion is generated by the blades 700 when the hub 500 is rotated by the shaft.

As illustrated, the blades 700 are each provided at the hub 500 through the rotation shaft 710 to be rotated with the hub 500 or to be rotated relative to the hub 500. The rotation of the blades 700 relative to the hub 500 achieves a folding movement of the blades 700.

To fold the blades 700, an additional component is provided on the shaft 100. The moving portion 300 is configured to be vertically slidable on the shaft 100. The moving portion 300 is connected to the shaft 100 through a spline connection, so that the moving portion 300 may be rotated with the shaft 100 and may also perform a relative vertical sliding movement on the shaft 100. The moving portion 300 may slide through a separate linear actuator or the like.

Furthermore, the link assembly 900 is provided between the moving portion 300 and the blades 700. Accordingly, the link assembly 900 conveys the sliding movement of the moving portion 300 to the blades 700, and the blades 700 are folded when rotated with respect to the rotation shaft 710. Thus, in a case where the moving portion 300 is fixed to the shaft 100 in a state where the blade 700 is unfolded as illustrated in FIG. 1, when the shaft 100 rotates, propulsion is generated through the propeller. In a case where the moving portion 300 slides, the blade 700 is folded while being rotated as illustrated in FIG. 2.

The link assembly 900 includes a plurality of links connecting the moving portion 300 and the blades 700 to each other, and enables the blades 700 to be rotated around the hub 500 as the moving portion 300 vertically slides such that the blades 700 are folded or unfolded. Based thereon, the blades 700 may be folded or unfolded with respect to the hub 500 in a state where the hub 500 is stationary when the moving portion 300 slides in a state where the shaft 100 is stationary, whereas the hub 500 and the blades 700 are rotated together when the shaft 100 rotates.

As illustrated in FIG. 1, the blades 700 may be connected to the hub 500 at respective points spaced from each other, and each of the blades 700 may be connected to the moving portion 300 through the link assembly 900. One blade 700' of the plurality of blades is fixed to the hub 500, and each of the other blades 700 is connected to the moving portion 300 through the link assembly 900. In the instant case, when the moving portion 300 slides, the fixed blade 700' remains stationary at the same position, and the other blades 700 are rotated by the link assembly 900 so that the blades 700 may be folded toward the fixed blade 700' or unfolded in a direction to be far away from the fixed blade 700'. In the present configuration, it is possible to fold the propeller such that all the blades gather together at one point, reducing drag acting on the fuselage.

A first link 910 is connected to the moving portion 300, a second link 920 is connected to a point of the shaft 100 between the moving portion 300 and the hub 500, and the first link 910 and the second link 920 are connected to intersect with each other such that when the moving portion 300 slides, the first link 910 and the second link 920 may perform a scissoring movement. Furthermore, the first link 910 and the second link 920 may move in a direction to spread out when the moving portion 300 moves up, and the first link 910 and the second link 920 may move in a direction to gather together when the moving portion 300 moves downwards.

In an exemplary embodiment of the present invention, the second link 920 is connected to a body 110 of the shaft 100 between the moving portion 300 and the hub 500. The body 110 of the shaft 100 is connected to the shaft 100 and may limit the upper movement of the moving portion 300.

Furthermore, a third link 930 may be connected to an end portion of the first link 910, the third link 930 may be bent in a horizontal direction thereof, a fourth link 940 may be connected to the bent end portion of the third link 930, and the blade 700 may be connected to the fourth link 940. The fourth link 940 may be guided by the third link 930 to perform a rotational movement, and the blade 700 may be folded or unfolded while being rotated according to the rotation of the fourth link 940.

That is, when the first link 910 is moved in a direction to become close to the shaft 100 as the moving portion 300 slides, the third link 930 may also be brought close to the shaft 100, the fourth link 940 may be rotated according to the movement of the third link 930, and the blade 700 may be folded while being rotated according to the rotation of the fourth link 940.

On the other hand, when the first link 910 is moved in a direction to become far away from the shaft 100 as the moving portion 300 slides, the third link 930 may also be brought far away from the shaft 100, the fourth link 940 may be rotated according to the movement of the third link 930, and the blade 700 may be unfolded while being rotated in the reverse direction according to the rotation of the fourth link 940.

Furthermore, as illustrated, the first link 910 and the second link 920 may be links existing on a plane in a direction perpendicular to the ground, the fourth link 940 may be a link existing on a plane in a direction horizontal to the ground, and the third link 930 may be a link having both end portions connected to the first link 910 and the fourth link 940, respectively, and having a bent center portion. Also, the blade 700 may be folded or unfolded on the plane in the direction horizontal to the ground.

FIG. 1 is a view exemplarily illustrating an unfolded state of a foldable propeller for air mobility according to various exemplary embodiments of the present invention, and FIG. 2 is a view exemplarily illustrating a folded state of the foldable propeller for air mobility according to various exemplary embodiments of the present invention. With reference to the drawings, the movement of the propeller according to various exemplary embodiments of the present invention when folded will be described below.

The moving portion 300 in the state of FIG. 1 slides downward on the shaft 100 following the arrow as illustrated in FIG. 2. When the moving portion 300 in the state of FIG. 1 slides downward, the first link 910 and the second link 920 are rotated in a direction to gather together according to the scissoring movement as illustrated in FIG. 2.

When the first link 910 acts in the present way, the first link 910 is brought close to the shaft 100, and accordingly, the third link 930 is also moved to become close to the shaft 100 in a direction as indicated by the arrow.

According to the movement of the third link 930, the third link 930 leads the fourth link 940, and accordingly, the fourth link 940 is moved and rotated simultaneously. Consequently, the blade 700 is rotated with respect to the rotation shaft 710 in the direction indicated by the arrow, and as a result, the blade 700 is folded as illustrated in FIG. 2.

The foldable propeller for air mobility according to various exemplary embodiments of the present invention may be folded, so that the propeller used for lifting purposes may be loaded in a folded state on the fuselage during flight for the air mobility, effectively reducing drag during cruising when the propeller is loaded in the folded state on the fuselage, which makes it possible to improve energy efficiency and increase a flight distance accordingly.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable propeller for an air mobility, the foldable propeller comprising:
   a shaft provided with a hub at an upper end portion of the shaft;
   blades, each of which is mounted to the hub through a rotation shaft to be rotated with the hub or to be rotated relative to the hub;
   a moving portion slidably mounted on the shaft; and
   a link assembly including a plurality of links connecting the moving portion and the blades and facilitating the blades to be rotated around the hub as the moving portion slides along the shaft so that the blades are folded to each other or unfolded from each other,
   wherein the plurality of links includes a first link and a second link, and
   wherein a first end portion of the first link is pivotally connected to the moving portion, and a first end portion of the second link is pivotally connected to a point of the shaft between the moving portion and the hub.

2. The foldable propeller of claim 1, wherein the hub and the blades are rotated together when the shaft rotates, and the blades are folded or unfolded with respect to the hub in a state where the hub is stationary when the moving portion slides along the shaft in a state where the shaft is stationary.

3. The foldable propeller of claim 1, wherein the blades are connected to the hub at points of the hub spaced from each other, respectively, and each of the blades is pivotally connected to the moving portion through the link assembly.

4. The foldable propeller of claim 3, wherein one of the blades is a fixed blade which is fixed to the hub, and each of remaining blades except the fixed blade among the blades is pivotally connected to the moving portion through the link assembly so that when the moving portion slides along the shaft, the remaining blades are folded toward the fixed blade or unfolded in a direction to be away from the fixed blade.

5. The foldable propeller of claim 4,
wherein a portion of the first link is pivotally connected to a second end portion of the second link so that when the moving portion slides along the shaft, the first link and the second link perform a scissoring movement therebetween.

6. The foldable propeller of claim 5,
wherein the plurality of links further includes a third link and a fourth link, and
wherein a first end portion of the third link is pivotally connected to a second end portion of the first link, a second end portion of the third link is bent in a perpendicular direction to a longitudinal axis of the third link, a first end portion of the fourth link is pivotally connected to the second end portion of the third link, and a second end portion of the fourth link is connected to one of the blades except the fixed blade.

7. The foldable propeller of claim 1, wherein
a portion of the first link is pivotally connected to a second end portion of the second link so that when the moving portion slides along the shaft, the first link and the second link perform a scissoring movement therebetween.

8. The foldable propeller of claim 1, wherein the first link and the second link move in a direction to unfold with respect to the shaft when the moving portion moves toward the hub, and the first link and the second link move in a direction to fold with respect to the shaft when the moving portion moves away from the hub.

9. The foldable propeller of claim 1,
wherein the plurality of links further includes a third link and a fourth link, and
wherein a first end portion of the third link is pivotally connected to a second end portion of the first link, a second end portion of the third link is bent in a perpendicular direction to a longitudinal axis of the third link, a first end portion of the fourth link is pivotally connected to the second end portion of the third link, and a second end portion of the fourth link is connected to one of the blades.

10. The foldable propeller of claim 9, wherein the fourth link is guided by the third link to perform a rotational movement of the fourth link, and the one of the blades is folded or unfolded while being rotated according to rotation of the fourth link.

11. The foldable propeller of claim 9, wherein when the first link is moved in a direction to be adjacent to the shaft as the moving portion slides along the shaft, the third link is brought adjacent to the shaft, the fourth link is rotated according to movement of the third link, and the one of the blades is folded while being rotated according to rotation of the fourth link.

12. The foldable propeller of claim 9, wherein when the first link is moved in a direction to become away from the shaft as the moving portion slides along the shaft, the third link is brought away from the shaft, the fourth link is rotated according to movement of the third link, and the one of the blades is unfolded while being rotated according to rotation of the fourth link.

13. The foldable propeller of claim 9, wherein the first link and the second link are links existing on a plane in a direction perpendicular to the ground, the fourth link is a link existing on a plane in a direction horizontal to the ground, and the third link is a link having both end portions connected to the first link and the fourth link, respectively, and having a bent center portion.

14. The foldable propeller of claim 9, wherein the one of the blades is folded or unfolded on a plane in a direction horizontal to the ground.

* * * * *